US010089361B2

(12) United States Patent
Murthy et al.

(10) Patent No.: US 10,089,361 B2
(45) Date of Patent: Oct. 2, 2018

(54) EFFICIENT MECHANISM FOR MANAGING HIERARCHICAL RELATIONSHIPS IN A RELATIONAL DATABASE SYSTEM

(75) Inventors: Ravi Murthy, Fremont, CA (US); Muralidhar Krishnaprasad, Redmond, WA (US); Sivasankaran Chandrasekar, Fremont, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/932,423

(22) Filed: Oct. 31, 2007

(65) Prior Publication Data

US 2009/0112913 A1 Apr. 30, 2009

(51) Int. Cl.
*G06F 7/00* (2006.01)
*G06F 17/30* (2006.01)

(52) U.S. Cl.
CPC .. *G06F 17/30513* (2013.01); *G06F 17/30312* (2013.01); *G06F 17/30938* (2013.01)

(58) Field of Classification Search
USPC .................................................. 707/793, 796
See application file for complete search history.

(56) References Cited

U.S. PATENT DOCUMENTS

| | | | |
|---|---|---|---|
| 5,388,259 A * | 2/1995 | Fleischman et al. | |
| 5,643,633 A | 7/1997 | Telford et al. | |
| 5,870,590 A | 2/1999 | Kita et al. | |
| 6,279,007 B1 * | 8/2001 | Uppala | |
| 6,330,573 B1 | 12/2001 | Salisbury et al. | |
| 6,427,123 B1 | 7/2002 | Sedlar | |
| 6,519,597 B1 | 2/2003 | Cheng et al. | |
| 6,697,805 B1 | 2/2004 | Choquier et al. | |
| 6,721,727 B2 * | 4/2004 | Chau | G06F 17/30917 |
| 7,171,404 B2 | 1/2007 | Lindblad et al. | |
| 7,171,407 B2 | 1/2007 | Barton et al. | |
| 7,174,327 B2 * | 2/2007 | Chau | G06F 17/30917 |

(Continued)

OTHER PUBLICATIONS

Claims, Foreign Application No. 200580018627.9, 3 pages.

(Continued)

*Primary Examiner* — Jeff A Burke
*Assistant Examiner* — Mariela Reyes
(74) *Attorney, Agent, or Firm* — Hickman Palermo Becker Bingham LLP

(57) ABSTRACT

A method and apparatus for managing hierarchical relationships in a relational database system is provided. An "orderkey" data type, which is native within a relational database system, is disclosed. The orderkey type is designed to contain values that represent the position of an entity relative to the positions of other entities within a hierarchy. Such values represent hierarchical relationships between those entities. Values that are of the orderkey type have properties that allow hierarchy-oriented functions to be performed in an especially efficient manner. Database functions, which operate on and/or produce values that are of the orderkey type, are also disclosed. Such functions can be placed within SQL statements that a database server executes, for example. In response to executing SQL statements that contain such functions, the database server performs hierarchy-oriented operations in a highly efficient manner.

26 Claims, 2 Drawing Sheets

(56) References Cited

U.S. PATENT DOCUMENTS

| | | | |
|---|---|---|---|
| 7,216,127 | B2 | 5/2007 | Auerbach |
| 9,760,652 | B2 * | 9/2017 | Lyle ................. G06F 17/30911 |
| 2001/0049675 | A1 | 12/2001 | Mandler et al. |
| 2001/0049682 | A1 * | 12/2001 | Vincent et al. ............... 707/100 |
| 2002/0107860 | A1 * | 8/2002 | Gobeille et al. ............. 707/101 |
| 2002/0152267 | A1 | 10/2002 | Lennon |
| 2002/0188613 | A1 | 12/2002 | Chakraborty et al. |
| 2003/0131051 | A1 | 7/2003 | Lection et al. |
| 2003/0177341 | A1 | 9/2003 | Devillers |
| 2004/0044659 | A1 | 3/2004 | Judd et al. |
| 2004/0167864 | A1 | 8/2004 | Wang et al. |
| 2004/0205551 | A1 | 10/2004 | Santos |
| 2005/0038688 | A1 | 2/2005 | Collins et al. |
| 2005/0050016 | A1 | 3/2005 | Stanoi et al. |
| 2005/0120031 | A1 | 6/2005 | Ishii |
| 2005/0228786 | A1 * | 10/2005 | Murthy et al. .................... 707/3 |
| 2005/0228792 | A1 | 10/2005 | Chandrasekaran et al. |
| 2005/0229158 | A1 * | 10/2005 | Thusoo et al. ................ 717/115 |
| 2005/0257201 | A1 | 11/2005 | Rose et al. |
| 2005/0289175 | A1 * | 12/2005 | Krishnaprasad .. G06F 17/30938 |

OTHER PUBLICATIONS

State Intellectual Property Office of P.R.C., "Notification of the First Office Action", Foreign Application No. 200580018627.9, mailed Oct. 12, 2007, 9 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the $30^{th}$ VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, $2^{nd}$ Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

* cited by examiner

| | NAME | SSN | BIRTHDATE | OKEY |
|---|---|---|---|---|
| | DORIAN GIESLER | 156-91-5224 | 7/5/1986 | 1 |
| | SINDY OMARA | 826-03-4691 | 11/27/1972 | 1.1 |
| | GALLAGHER NORTHEY | 892-47-7607 | 11/14/1962 | 1.2 |
| | BEATRICE STALL | 471-17-9361 | 5/21/1969 | 1.1.1 |
| | GARDENIA NICOLA | 721-29-9918 | 1/17/1954 | 1.3 |
| | TANNER REAM | 251-87-5318 | 5/14/1968 | 1.3.1 |
| | LAURESSA NEWMAN | 871-59-1369 | 3/21/1973 | 1.3.1.1 |
| | OPAL CAVALET | 602-24-0081 | 10/22/1967 | 1.3.1.2 |
| | RANDOLF QUINN | 274-67-4437 | 2/19/1976 | 1.1.2 |
| | TEMPLE KNIGHT | 767-68-5134 | 9/28/1987 | 1.3.1.3 |
| | GEFFREY FULTON | 330-26-4938 | 6/17/1968 | 1.3.1.4 |

EFFICIENT MECHANISM FOR MANAGING HIERARCHICAL RELATIONSHIPS IN A RELATIONAL DATABASE SYSTEM

RELATED APPLICATIONS

The present application is related to U.S. patent application Ser. No. 10/884,311, which was filed on Jul. 2, 2004, which is titled "INDEX FOR ACCESSING XML DATA," and which is incorporated by reference for all purposes as though fully disclosed herein.

FIELD OF THE INVENTION

The present invention relates to relational databases, and, more specifically, to database data types and database query language operators.

BACKGROUND

Parent-child relationships are very common in relational database schemas. For example, a database schema might indicate a relationship between a manager (the "parent") and one or more employees (the "children") who are subordinate to that manager. For another example, a database schema might indicate a relationship between a purchase order (the "parent") and one or more lines (the "children") that are a part of that purchase order. Data that contains such parent-child relationships is called hierarchical data, since the parent-child relationships form a hierarchy.

Typically, the way that a parent-child relationship is modeled within a relational database table is to include, within the table that contains the "child" records, a column that indicates a row identifier for a "parent" record that is related to those child records in a parent-child relationship (in a relational database table, each row of the table may have a unique row identifier). For example, in an "employee" table, an employee "Alice" might be a child record of another employee "Mel;" Mel might be Alice's manager, for example. The employee table might contain a "manager ID" (i.e., the parent ID) column. In the employee table, the row containing Alice's record might contain, in the manager ID column, the row identifier for the row (in the employee table) that contains Mel's record. Taking the example further, if Mel is also the manager for employees "Vera" and "Flo," then, in the employee table, the rows containing Vera's and Flo's records might also contain, in the manager ID column, the row identifier for the row that contains Mel's record. If Mel himself has a manager, then the value of the manager ID in Mel's record might also indicate the row identifier for the row that contains Mel's manager's record.

Structured Query Language (SQL) has operators and constructs that allow an interested user to formulate queries that, when executed, will (a) cause all of the children of a specified parent to be returned, (b) cause all of the descendants (i.e., the children of, the children of those children, etc.) of a specified parent to be returned, (c) cause the parent of a specified child to be returned, and/or (d) cause all of the ancestors (i.e., the parent of, the parent of that parent, etc.) of a specified child to be returned.

Using such an approach, determining the immediate parent or children of a specified entity may be accomplished fairly trivially using a simple index lookup. However, determining more extended relationships, such as all ancestors or all descendants of a specified entity, can be much more complicated. Although SQL contains a "CONNECT-BY" construct that permits such complicated operations to be expressed in a relatively compact manner, evaluating a query that contains such a construct involves an N-step algorithm in which each step involves a separate index scan. For example, if a query requests all of the descendants of a specified entity, and if there are N levels of descendants represented in the hierarchy, then evaluating the query will involve at least N separate index scans.

Where N is very large, evaluating such a query can be very costly in terms of both time and computing resources. Database system performance can suffer when such a query is evaluated. What is needed is a way of obtaining, from a database, hierarchical relationship information, such as all of the ancestors or descendants of a specified entity, without incurring the high costs that are associated with large numbers of index scans. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figures 1, 2:
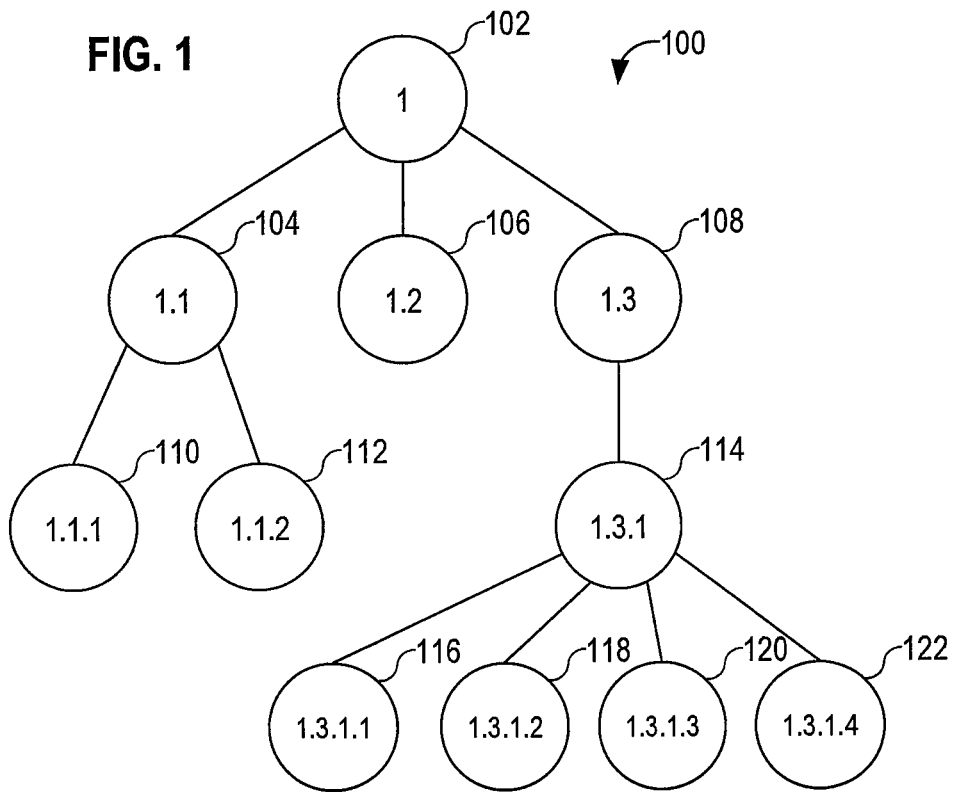
FIG. 1 illustrates a conceptual example of a hierarchy, according to an embodiment of the invention.
FIG. 2 illustrates a conceptual example of a relational database table that contains an orderkey-type column that stores various hierarchically-related entities' corresponding orderkey values, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, a new data type, which is native within a relational database system, is introduced. This new "orderkey" data type is designed specifically to contain values that represent the position of an entity relative to the positions of other entities within a hierarchy. Values that are of the orderkey type represent hierarchical relationships (e.g., parent-child and sibling-sibling relationships) between entities within a hierarchy. Values that are of the orderkey type have properties that allow hierarchy-oriented functions to be performed in an especially efficient manner. Additionally, in one embodiment of the invention, several new database functions, which operate on and/or produce values that are of the orderkey type, are introduced. Such functions can be placed within SQL statements that a database server executes, for example. In response to executing SQL statements that contain such functions, the database server performs hierarchy-oriented operations in a highly efficient manner. For example, in one embodiment of the invention, a database server that executes such a function determines all descendants of a specified entity within a hierarchy by performing a range-based scan on a B-tree index on orderkey values of the entities within that hierarchy.

Orderkey Native Data Type

According to one embodiment of the invention, a database server is enhanced to recognize and understand an "orderkey" native data type. The orderkey data type is native to the database server in the same way that data types such as "number," "date," and "string" are native to the database server. Columns of a relational database table may be specified to contain values that are of the orderkey type. Beneficially, the orderkey data type is capable of capturing and representing not only the immediate parent or child of a specified entity, but also is capable of capturing and representing the entire "lineage" of such an entity; specifying such a lineage is not a task that other native data types were designed to do.

In one embodiment of the invention, the orderkey data type is an opaque data type—opaque like a number or a string. A value that is of an orderkey data type encompasses and encapsulates the notion of the lineage of (i.e., the complete ancestry of) an entity that is specified in a record within a row of a relational database table. In the same manner that columns of a relational database table can be created with types such as number or string, in one embodiment of the invention, such columns can be created with the orderkey data type. A column having the orderkey data type stores values that are of type orderkey. In one embodiment of the invention, values of type orderkey specify sets of bytes.

According to one embodiment, the hierarchical order information is represented using a Dewey-type value. Specifically, in one embodiment, the orderkey of a node is created by appending a value to the orderkey of the node's immediate parent, where the appended value indicates the position, among the children of the parent node, of that particular child node.

For example, a particular node D might be the child of a node C, which itself might be a child of a node B that is a child of a node A. Node D might have the orderkey 1.2.4.3. Under such circumstances, the final "3" in the orderkey indicates that the node D is the third child of its parent node C. Similarly, the 4 indicates that node C is the fourth child of node B. The 2 indicates that Node B is the second child of node A. The leading 1 indicates that node A is the root node (i.e., has no parent).

As mentioned above, the orderkey of a child may be easily created by appending, to the orderkey of the parent, a value that corresponds to the number of the child. Similarly, the orderkey of the parent is easily derived from the orderkey of the child by removing the last number in the orderkey of the child.

According to one embodiment, the composite numbers represented by each orderkey are converted into byte-comparable values, so that a mathematical comparison between two orderkeys indicates the relative position, within a hierarchy, of the nodes to which the orderkeys correspond.

For example, the node associated with the orderkey 1.2.7.7 precedes the node associated with the orderkey 1.3.1 in a theoretical hierarchical structure. Thus, the database server uses a conversion mechanism that converts orderkey 1.2.7.7 to a first value, and to convert orderkey 1.3.1 to a second value, where the first value is less than the second value. By comparing the second value to the first value, the database server can easily determine that the node associated with the first value precedes the node associated with the second value. Various conversion techniques may be used to achieve this result, and embodiments of the invention are not limited to any particular conversion technique.

Orderkey-Based Database Functions

In one embodiment of the invention, a database server is enhanced to recognize, understand, and execute database language functions that involve values that are of the orderkey type. Database users and database applications may specify these functions within SQL queries, for example. Some example functions, according to various embodiments of the invention, are described below. First, functions for obtaining new orderkey values, to be inserted into relational database table rows, are described. After these, functions for querying existing orderkey values that already exist within relational database table rows are described.

In one embodiment of the invention, a database server is designed to recognize, understand, and execute a function called "GET_NEW_OKEY." GET_NEW_OKEY does not require any input parameters. In response to evaluating GET_NEW_OKEY, a database server returns a new value that is of type orderkey. The new value corresponds to a new "root." As used herein, a "root" is the entity that is represented at the root node of a hierarchy; such a root node has no parent, but may have or gain any number of children. Thus, in one embodiment of the invention, the evaluation of GET_NEW_OKEY causes the database server to create, conceptually, a new hierarchy and return the value (of type orderkey) that, among other qualities, corresponds to the entity that is at the root node of that hierarchy. In typical usage, after obtaining the returned value from GET_NEW_OKEY, a user or application would actually create (if they had not already done so) a row in a relational database table, and would populate an appropriate column (of type orderkey) of that row with the returned value.

In one embodiment of the invention, a database server is designed to recognize, understand, and execute a function called "GET_FIRST_CHILD_OKEY." In one embodiment of the invention, GET_FIRST_CHILD_OKEY accepts, as input, a parameter that specifies a value (of type orderkey) that corresponds to a parent entity. In one embodiment of the invention, GET_FIRST_CHILD_OKEY returns a value (of type orderkey) that corresponds to an entity that is the first-ordered immediate child of the parent entity. Thus, in one embodiment of the invention, the children of a particular parent are ordered relative to one another; for example, if there are three children of a particular parent, then one child is the first child, one child is the second child, and one child is the third child. In typical usage, after obtaining the returned value from GET_FIRST_CHILD_OKEY, a user or application would actually create (if they had not already done so), in a relational database table, a row that corresponded to the first child of the specified parent, and would populate an appropriate column (of type orderkey) of that row with the returned value. The returned value would indicate, among other qualities, that the entity represented by that row is the first-ordered child of the entity that is represented within the parent's row.

In one embodiment of the invention, a database server is designed to recognize, understand, and execute a function called "GET_SIBLING_OKEY." In one embodiment of the invention, GET_SIBLING_OKEY accepts, as input, a first parameter that specifies a value (of type orderkey) that corresponds to a higher-ordered sibling entity. In one embodiment of the invention, GET_SIBLING_OKEY additionally accepts, as input, an optional second parameter that specifies a value (of type orderkey) that corresponds to a lower-ordered sibling entity. In one embodiment of the invention, GET_SIBLING_OKEY returns a value (of type orderkey) that corresponds to an entity that is an immediately lower-ordered sibling of the higher-ordered sibling (as indicated by the first parameter). In one embodiment of the invention, if the second, optional parameter of GET_SIBLING_OKEY has been specified, then the returned value corresponds additionally to an immediately higher-ordered sibling of the lower-ordered sibling (as indicated by the second parameter).

For example, if the first input parameter of GET_SIBLING_OKEY specifies the currently first-ordered child of a particular entity, and if the second input parameter of GET_SIBLING_OKEY specifies the currently second-ordered child of the particular entity, then GET_SIBLING_OKEY returns a value that corresponds to a sibling (of the currently first- and second-ordered children) whose order is in between the first-ordered child and the second-ordered child-under such circumstances, the current second-ordered child essentially becomes the new third-ordered child (although, in one embodiment of the invention, the orderkey values for the already existing children do not change), and the returned value corresponds to a new second-ordered child. The parent of the new sibling is the same as the parent for the siblings whose orderkey values were specified as input parameters to GET_SIBLING_OKEY. In typical usage, after obtaining the returned value from GET_SIBLING_OKEY, a user or application would actually create (if they had not already done so), in a relational database table, a row that corresponded to the new sibling, and would populate an appropriate column (of type orderkey) of that row with the returned value.

The foregoing functions just described are for obtaining new orderkey values that are to be inserted into relational database table rows. Below, functions for querying existing orderkey values that already exist within relational database table rows are described.

In one embodiment of the invention, a database server is designed to recognize, understand, and execute a function called "GET_PARENT_OKEY." In one embodiment of the invention, GET_PARENT_OKEY accepts, as input, a parameter that specifies a value (of type orderkey) that corresponds to a particular entity. In one embodiment of the invention, GET_PARENT_OKEY returns a value (of type orderkey) that corresponds to an existing parent of the entity that corresponds to the input parameter.

In one embodiment of the invention, a database server is designed to recognize, understand, and execute a function called "GET_OKEY_LEVEL." In one embodiment of the invention, GET_OKEY_LEVEL accepts, as input, a parameter that specifies a value (of type orderkey) that corresponds to a particular entity. In one embodiment of the invention, GET_OKEY_LEVEL returns a value (e.g., of type number) that indicates the level of the hierarchy at which the particular entity exists. This value essentially expresses how many entities hierarchically intervene between (a) the entity at the root node of the hierarchy and (b) the particular entity. For example, the entity at the root node of the hierarchy might exist at level one. The immediate children of that entity might exist at level two. The immediate children of those entities might exist at level three, and so on.

In one embodiment of the invention, a database server is designed to recognize, understand, and execute a function called "IS_PARENT_OF." In one embodiment of the invention, IS_PARENT_OF accepts, as input, two parameters. Each such parameter specifies a value (of type orderkey) that corresponds to a separate entity. In one embodiment of the invention, IS_PARENT_OF returns a value (e.g., of type Boolean) that indicates either true (or "1") or false (or "0"). In one embodiment of the invention, if (a) the entity that corresponds to the first parameter is the immediate parent of (b) the entity that corresponds to the second parameter, then IS_PARENT_OF returns "true." Otherwise, IS_PARENT_OF returns "false."

In one embodiment of the invention, a database server is designed to recognize, understand, and execute a function called "IS_ANCESTOR_OF." In one embodiment of the invention, IS_ANCESTOR_OF accepts, as input, two parameters. Each such parameter specifies a value (of type orderkey) that corresponds to a separate entity. In one embodiment of the invention, IS_ANCESTOR_OF returns a value (e.g., of type Boolean) that indicates either true (or "1") or false (or "0"). In one embodiment of the invention, if (a) the entity that corresponds to the first parameter is a hierarchical ancestor (not necessarily immediate) of (b) the entity that corresponds to the second parameter, then IS_ANCESTOR_OF returns "true." Otherwise, IS_ANCESTOR_OF returns "false."

Beneficially, by using the functions described above, database users and database applications do not need to formulate queries using the relatively complicated "CONNECT-BY" syntax.

Orderkey Properties

According to one embodiment of the invention, each value of type orderkey possesses and satisfies the set of properties that are described below. First, each orderkey value reflects a hierarchical ordering. This means that if a hierarchy is represented as a tree structure, and if each node in the tree structure is numbered according to some ordering scheme (e.g., depth-first traversal), such that each node has a unique number that at least partially signifies its position in the tree structure relative to other nodes therein, then the bytes of an orderkey value that corresponds to a particular node in the tree structure will at least represent the number that corresponds to the particular node. Additionally, in one embodiment of the invention, if a first entity is a child of a second entity, then the orderkey value for the first entity's row will be larger than the orderkey value for the second entity's row. Similarly, in one embodiment of the invention, if a first entity is a lower-ordered sibling of a second entity, then the orderkey value for the first entity's row will be larger than the orderkey value for the second entity's row.

Second, each particular value of type orderkey, except for a value that corresponds to a root node in a hierarchy, has a prefix (in bytes) that is identical to the orderkey value of the immediate parent of the node to which that particular value corresponds. For example, if the orderkey value for a particular entity is represented as "1," then the orderkey values for the immediate children of the particular entity might be represented (conceptually) as "1.1," "1.2," "1.3," and so on. Extending the example, if the orderkey value for a particular entity is "1.3," then the orderkey values for the immediate children of the particular entity might be represented (conceptually) as "1.3.1," "1.3.2," "1.3.3," and so on. Thus, each orderkey value identifies an entire hierarchical lineage of an entity to which that orderkey value corresponds. Because each orderkey value identifies such a lineage, the orderkey-based functions described above can be performed using relatively few index scans.

Third, a new orderkey can be constructed such that the value of that new orderkey exists between the values of two existing orderkeys. For example, if the orderkey values for two orderkeys are represented (conceptually) as "1.1" and "1.2," then, in one embodiment of the invention, a new orderkey can be created (e.g. as a sibling of the orderkey whose value is "1.1" and/or as a child of the orderkey whose value is "1," using functions discussed above) with a value that is between "1.1" and "1.2." In one embodiment of the invention, in order to make in-between orderkey creation possible, orderkey values take the form of floating-point numbers rather than integers. For example, the value of an orderkey that is created to be in between the orderkeys with values of "1.1" and "1.2" might be represented (conceptually) as "1.(1½)" (which is not the same, conceptually, as "1.1.5."—while "1.(1½)" is on the second hierarchical level and is an immediate child of "1," "1.1.5" is on the third hierarchical level and is an immediate child of "1.1").

Thus, in one embodiment of the invention, each orderkey has all of the properties that are discussed above. However, orderkeys and the values thereof might be encoded in a variety of different ways while still possessing all of these properties. Various manners of encoding orderkeys and the values thereof are within the scope of various embodiments of the invention. In one embodiment of the invention, each orderkey is a sequence of bytes; for example, each byte in the sequence may correspond to a different level in a hierarchy. For a more specific example, if a particular orderkey value was "1.3.5," then the first byte of that orderkey might represent "1" (corresponding to the first hierarchical level), the second byte of that orderkey might represent "3" (corresponding to the second hierarchical level), and the third byte of that orderkey might represent "5" (corresponding to the third hierarchical level).

Efficiencies Gained from Orderkey Properties

Due to at least some of the orderkey properties described above, in one embodiment of the invention, many of the orderkey-based functions described above (e.g., IS_ANCESTOR_OF) can be implemented as, or re-written by a database server as, relatively simple byte-level comparisons. For example, to find all of the descendants of a particular entity, a database server can simply determine the set of entities, in the hierarchy, whose orderkey values are prefixed by the orderkey value of the particular entity; each entity in such a set is a descendant of the particular entity. Thus, a problem which previously would have been solved in N steps is reduced to a range-based problem that can be solved in fewer than N steps. A single index range scan on a B-tree can be used to find, relatively quickly, all entities whose orderkey values have a specified prefix.

Maximum Child Orderkey

In one embodiment of the invention, for each entity in a hierarchy, a "maximum child orderkey" is defined for that entity. The maximum child orderkey of a particular entity represents the theoretical maximum value that any orderkey of any child of that particular entity could have. In one embodiment of the invention, to find all immediate children of a particular entity in a hierarchy, a range-based index scan is performed to determine all entities whose orderkey values are both (a) greater than the orderkey value of the particular entity (i.e., the parent) and (b) less than or equal to the maximum child orderkey for the particular entity.

Example Hierarchical Relational Data Structures

FIG. 1 illustrates a conceptual example of a hierarchy 100, according to an embodiment of the invention. Each node in hierarchy 100 corresponds to a separate real-world entity (in this example, each node corresponds to a person in a corporate organization). Additionally, in hierarchy 100, each node is labeled with a value of type orderkey—the orderkey value that corresponds to that node's entity. Such values may be generated using functions such as GET_NEW_OKEY, GET_FIRST_CHILD_OKEY, and GET_SIBLING_OKEY, as discussed above. The values shown are conceptual in nature; actual orderkey values may be in a more highly compressed form that those shown.

At the first level of hierarchy 100, node 102 has an orderkey value of "1," indicating that node 102 is the root node of hierarchy 100.

At the second level of hierarchy 100, node 104 has an orderkey value of "1.1," indicating that node 104 is a child of node 102. Node 106 has an orderkey value of "1.2," indicating that node 106 is a child of node 102 and is a lower-ordered sibling of node 104. Node 108 has an orderkey value of "1.3," indicating that node 108 is a child of node 102 and is a lower-ordered sibling of nodes 104 and 106.

At the third level of hierarchy 100, node 110 has an orderkey value of "1.1.1," indicating that node 110 is a child of node 104. Node 112 has an orderkey value of "1.1.2," indicating that node 112 is a child of node 104 and is a lower-ordered sibling of node 110. Node 114 has an orderkey value of "1.3.1," indicating that node 114 is a child of node 108.

At the fourth level of hierarchy 100, node 116 has an orderkey value of "1.3.1.1," indicating that node 116 is a child of node 114. Node 118 has an orderkey value of "1.3.1.2," indicating that node 118 is a child of node 114 and is a lower-ordered sibling of node 116. Node 120 has an orderkey value of "1.3.1.3," indicating that node 120 is a child of node 114 and is a lower-ordered sibling of nodes 116 and 118. Node 122 has an orderkey value of "1.3.1.4," indicating that node 122 is a child of node 114 and is a lower-ordered sibling of nodes 116, 118, and 120.

Such orderkey values may be inserted into an orderkey-type column of a relational database table. A B-tree index may be created on such a column to enable more efficient performance of hierarchy-based operations on the data in such a relational database table. FIG. 2 illustrates a conceptual example of a relational database table 200 that contains an orderkey-type column that stores various hierarchically-related entities' corresponding orderkey values, according to an embodiment of the invention.

Relational database table 200 contains four columns. Among these columns, column 202 specifies values of people's names and might contain values of type "string." Column 204 specifies values of people's social security numbers and might contain values of type "number." Column 206 specifies values of people's birthdates and might contain values of type "date." Column 208 specifies values of people's corresponding orderkeys and contains values of type "orderkey" (and only values of type "orderkey").

In relational table 200, the record for "Dorian Giesler" specifies, in column 208, an orderkey value of "1." Thus, "Dorian Giesler" is the entity that corresponds to node 102 in hierarchy 100.

In relational table 200, the record for "Sindy Omara" specifies, in column 208, an orderkey value of "1.1." Thus, "Sindy Omara" is the entity that corresponds to node 104 in hierarchy 100.

In relational table 200, the record for "Gallagher Northey" specifies, in column 208, an orderkey value of "1.2." Thus, "Gallagher Northey" is the entity that corresponds to node 106 in hierarchy 100.

In relational table 200, the record for "Beatrice Stall" specifies, in column 208, an orderkey value of "1.1.1." Thus, "Beatrice Stall" is the entity that corresponds to node 110 in hierarchy 100.

In relational table 200, the record for "Gardenia Nicola" specifies, in column 208, an orderkey value of "1.3." Thus, "Gardenia Nicola" is the entity that corresponds to node 108 in hierarchy 100.

In relational table 200, the record for "Tanner Ream" specifies, in column 208, an orderkey value of "1.3.1." Thus, "Tanner Ream" is the entity that corresponds to node 114 in hierarchy 100.

In relational table 200, the record for "Lauressa Newman" specifies, in column 208, an orderkey value of "1.3.1.1." Thus, "Lauressa Newman" is the entity that corresponds to node 116 in hierarchy 100.

In relational table 200, the record for "Opal Cavalet" specifies, in column 208, an orderkey value of "1.3.1.2." Thus, "Opal Cavalet" is the entity that corresponds to node 118 in hierarchy 100.

In relational table 200, the record for "Randolf Quinn" specifies, in column 208, an orderkey value of "1.1.2." Thus, "Randolf Quinn" is the entity that corresponds to node 112 in hierarchy 100.

In relational table 200, the record for "Temple Knight" specifies, in column 208, an orderkey value of "1.3.1.3." Thus, "Temple Knight" is the entity that corresponds to node 120 in hierarchy 100.

In relational table 200, the record for "Geffrey Fulton" specifies, in column 208, an orderkey value of "1.3.1.4." Thus, "Geffrey Fulton" is the entity that corresponds to node 122 in hierarchy 100.

Based on the values in column 208, a database server can quickly determine, with reference to a B-tree index formed on column 208, various relationships between the entities that are represented in hierarchy 100. For example, the database server can quickly determine that the children of "Dorian Giesler" are "Sindy Omara," "Gallagher Northey," and "Gardenia Nicola." For another example, the database server can quickly determine that the children of "Sindy Omara" are "Beatrice Stall" and "Randolf Quinn." For another example, the database server can quickly determine that the descendants of "Gardenia Nicola" are "Tanner Ream" and his children, "Lauressa Newman," "Opal Cavalet," "Temple Knight," and "Geffrey Fulton." For another example, the database server can quickly determine that the ancestors of "Temple Knight" are "Tanner Ream," "Gardenia Nicola," and "Dorian Giesler." For another example, the database server can quickly determine that the siblings of "Gardenia Nicola" are "Sindy Omara" and "Gallagher Northey." The database server can determine such relationships even without the use of the "CONNECT-BY" SQL construct.

In one embodiment of the invention, the hierarchical relationships between entities (such as the hierarchical relationships depicted in FIG. 1) are real-world relationships that indicate some real hierarchical relationship between real-world entities (such as people). For example, in hierarchy 100, parent-child relationships between nodes may represent real-world manager-subordinate employee relationships in a corporation.

Hardware Overview

Figure 3:
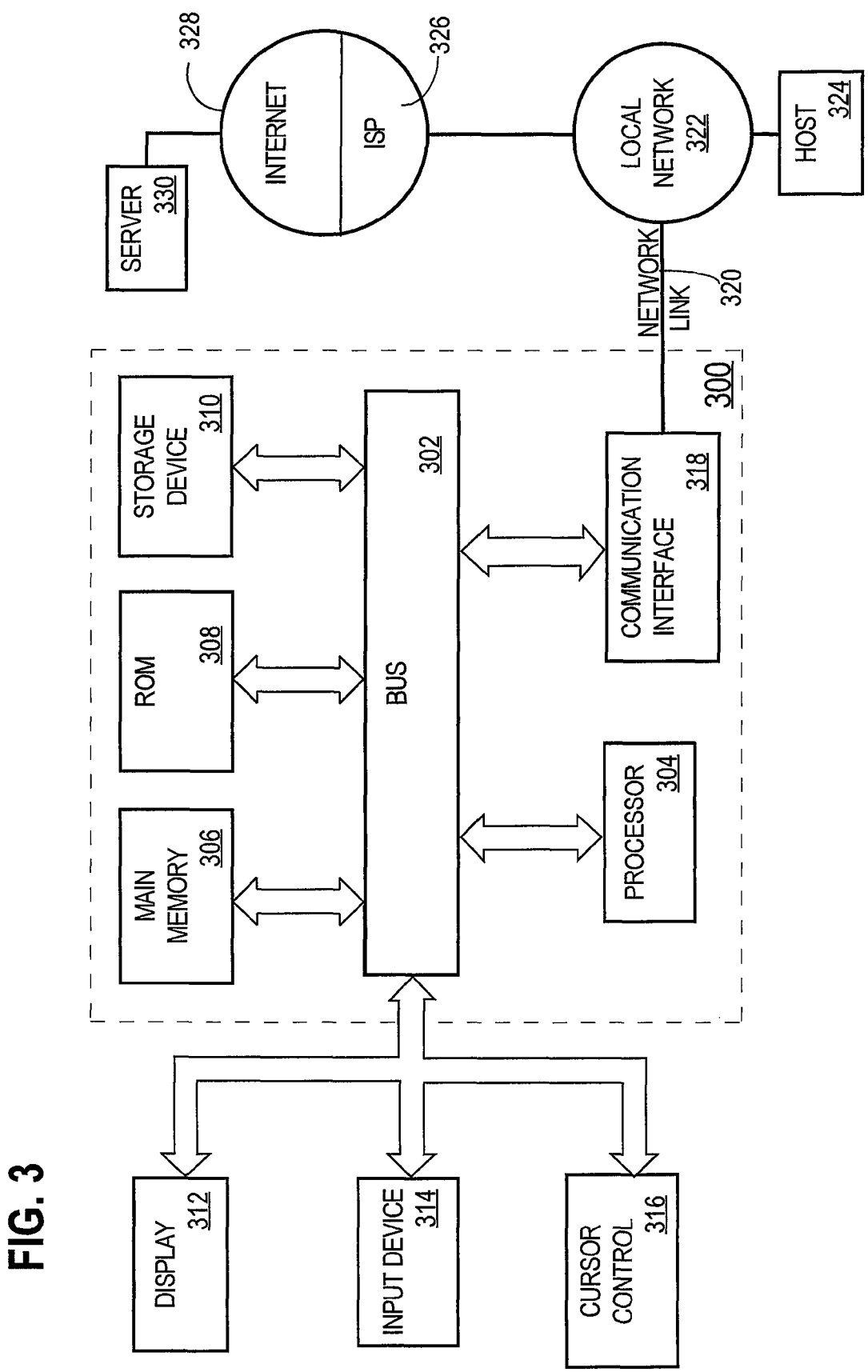
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving, as input to a previously defined function within a database, a plurality of values, of a particular data type, that each indicate a respective position within a hierarchy;
   wherein each value of the plurality of values indicates, for the respective position within the hierarchy indicated by the each value, a complete hierarchical lineage of the respective position within the hierarchy;
   the function returning a result value based on both:
   (a) the plurality of values; and
   (b) a hierarchical relationship of the respective positions within the hierarchy.

2. The method of claim 1, wherein:
   the plurality of values includes a first parameter value that represents a first position in the hierarchy and a second parameter value that represents a second position within the hierarchy; and
   the result value indicates whether the first position is a parent of the second position within the hierarchy.

3. The method of claim 1, wherein:
   the plurality of values includes a first parameter value that represents a first position in the hierarchy and a second parameter value that represents a second position within the hierarchy; and
   the result value indicates whether the first position is an ancestor of the second position within the hierarchy.

4. The method of claim 1 further comprising:
   generating a first value that represents a first entity's position in the hierarchy relative to other entities in the hierarchy;
   storing the first value in a cell that corresponds to (a) a first row and (b) a particular column of a relational database table in the database, the particular column for storing values of the particular data type; and
   in response to a request to insert a new entity as an immediate child of the first entity, generating, for the new entity, a new value of the particular data type, said new value being a sequence of numbers;
   wherein generating the new value comprises generating at least one number in said sequence as a non-integer number that falls within a range bounded by consecutive integers found within position-representing values of other immediate children of the first entity; and wherein the first row contains data for a record that pertains to the first entity.

5. The method of claim 4, wherein said database includes native functions, defined for said particular data type, that operate on values that represent positions within the hierarchy; and further comprising:
defining, for the first entity, a single maximum child orderkey that represents a maximum value that all orderkeys of all current and future immediate children of the first entity are permitted to be within the particular column;
wherein the particular column is configured to contain only values that are of the particular data type;
wherein the particular data type is native to the database;
wherein the particular data type is not defined by an end user of the database;
wherein said sequence of numbers is a sequence of delimited numbers;
wherein said sequence of delimited numbers contains a quantity of numbers equal to a level of the hierarchy at which the new entity is to be inserted.

6. The method of claim 4, further comprising:
generating a second value that represents a second entity's position in the hierarchy relative to the first entity; and
storing the second value in a second row and the particular column of the relational database table;
wherein the second row contains data for a record that pertains to the second entity.

7. The method of claim 4, further comprising:
generating a second value that indicates that a second entity is an immediate child of the first entity in the hierarchy; and
storing the second value in a second row and the particular column of the relational database table.

8. The method of claim 4, further comprising:
generating a second value that contains (a) a prefix that is equal to the first value and (b) a suffix; and
storing the second value in a second row and the particular column of the relational database table;
wherein the prefix indicates that a second entity is an immediate child of the first entity in the hierarchy.

9. The method of claim 4, further comprising:
executing a SQL instruction that specifies a particular function that indicates the first value as a parameter of the particular function;
in response to evaluating the particular function, generating a second value that indicates that a second entity is an immediate child of an entity that corresponds to the first value; and
storing the second value in a second row and the particular column of the relational database table.

10. The method of claim 4, further comprising:
generating a second value that indicates that a second entity is a sibling of the first entity in the hierarchy; and
storing the second value in a second row and the particular column of the relational database table.

11. The method of claim 4, further comprising:
generating a second value that contains (a) a particular prefix that is equal to a prefix of the first value and (b) a particular suffix that is not equal to a suffix of the first value; and
storing the second value in a second row and the particular column of the relational database table;
wherein the equality of the prefixes of the first and second values indicate that the first and second entities are both descendants of a particular entity to which the particular prefix corresponds.

12. The method of claim 4, further comprising:
executing a SQL instruction that specifies a particular function that indicates the first value as a parameter of the particular function;
in response to evaluating the particular function, generating a second value that indicates that a second entity is a sibling of an entity that corresponds to the first value; and
storing the second value in a second row and the particular column of the relational database table.

13. The method of claim 4, further comprising:
in response to a command to select all immediate children of the first entity, determining all rows in the relational database table that contain, and only rows that contain, in the particular column, values that are both (a) greater than the first value and (b) no greater than the maximum child orderkey defined for the first entity, thereby determining a set of rows; selecting the set of rows from the relational database table; and returning data only from the rows in response to the command.

14. The method of claim 4, further comprising:
in response to a command to select all ancestors of the first entity, selecting, from the relational database table, all rows that contain, and only rows that contain, in the particular column, values having a prefix that is equal to the first value.

15. A non-transitory computer-readable storage medium storing instructions which, when executed by one or more processors, cause the one or more processors to perform certain steps comprising:
receiving, as input to a previously defined function within a database, a plurality of values, of a particular data type, that each indicate a respective position within a hierarchy;
wherein each value of the plurality of values indicates, for the respective position within the hierarchy indicated by the each value, a complete hierarchical lineage of the respective position within the hierarchy;
the function returning a result value based on both:
(a) the plurality of values; and
(b) a hierarchical relationship of the respective positions within the hierarchy.

16. The non-transitory computer-readable storage medium of claim 15, wherein the certain steps further comprise:
generating a first value that represents a first entity's position in the hierarchy relative to other entities in the hierarchy;
storing the first value in a cell that corresponds to (a) a first row and (b) a particular column of a relational database table in the database, the particular column for storing values of the particular data type; and
in response to a request to insert a new entity as an immediate child of the first entity, generating, for the new entity, a new value of the particular data type, said new value being a sequence of numbers;
wherein generating the new value comprises generating at least one number in said sequence as a non-integer number that falls within a range bounded by consecutive integers found within position-representing values of other immediate children of the first entity;
wherein the first row contains data for a record that pertains to the first entity.

17. The non-transitory computer-readable medium of claim 16, wherein said database includes native functions, defined for said particular data type, that operate on values that represent positions within the hierarchy; and wherein the certain steps further comprise:

defining, for the first entity, a single maximum child orderkey that represents a maximum value that all orderkeys of all current and future immediate children of the first entity are permitted to be within the particular column;

wherein the particular column is configured to contain only values that are of the particular data type;

wherein the particular data type is native to the database;

wherein the particular data type is not defined by an end user of the database;

wherein said sequence of numbers is a sequence of delimited numbers;

wherein said sequence of delimited numbers contains a quantity of numbers equal to a level of the hierarchy at which the new entity is to be inserted.

18. The non-transitory computer-readable medium of claim 16, wherein the certain steps further comprise:

generating a second value that represents a second entity's position in the hierarchy relative to the first entity; and storing the second value in a second row and the particular column of the relational database table;

wherein the second row contains data for a record that pertains to the second entity.

19. The non-transitory computer-readable medium of claim 16, wherein the certain steps further comprise:

generating a second value that indicates that a second entity is an immediate child of the first entity in the hierarchy; and storing the second value in a second row and the particular column of the relational database table.

20. The non-transitory computer-readable medium of claim 16, wherein the certain steps further comprise:

generating a second value that contains (a) a prefix that is equal to the first value and (b) a suffix; and storing the second value in a second row and the particular column of the relational database table;

wherein the prefix indicates that a second entity is an immediate child of the first entity in the hierarchy.

21. The non-transitory computer-readable medium of claim 16, wherein the certain steps further comprise:

executing a SQL instruction that specifies a particular function that indicates the first value as a parameter of the particular function;

in response to evaluating the particular function, generating a second value that indicates that a second entity is an immediate child of an entity that corresponds to the first value; and storing the second value in a second row and the particular column of the relational database table.

22. The non-transitory computer-readable medium of claim 16, wherein the certain steps further comprise:

generating a second value that indicates that a second entity is a sibling of the first entity in the hierarchy; and storing the second value in a second row and the particular column of the relational database table.

23. The non-transitory computer-readable medium of claim 16, wherein the certain steps further comprise:

generating a second value that contains (a) a particular prefix that is equal to a prefix of the first value and (b) a particular suffix that is not equal to a suffix of the first value; and storing the second value in a second row and the particular column of the relational database table;

wherein the equality of the prefixes of the first and second values indicate that the first and second entities are both descendants of a particular entity to which the particular prefix corresponds.

24. The non-transitory computer-readable medium of claim 16, wherein the certain steps further comprise:

executing a SQL instruction that specifies a particular function that indicates the first value as a parameter of the particular function;

in response to evaluating the particular function, generating a second value that indicates that a second entity is a sibling of an entity that corresponds to the first value; and storing the second value in a second row and the particular column of the relational database table.

25. The non-transitory computer-readable storage medium of claim 16, wherein the certain steps further comprise:

in response to a command to select all immediate children of the first entity, determining all rows in the relational database table that contain, and only rows that contain, in the particular column, values that are both (a) greater than the first value and (b) no greater than the maximum child orderkey defined for the first entity, thereby determining a set of rows; selecting the set of rows from the relational database table; and returning data only from the rows in response to the command.

26. The non-transitory computer-readable storage medium of claim 16, wherein the certain steps further comprise:

in response to a command to select all ancestors of the first entity, selecting, from the relational database table, all rows that contain, and only rows that contain, in the particular column, values having a prefix that is equal to the first value.

* * * * *

UNITED STATES PATENT AND TRADEMARK OFFICE
CERTIFICATE OF CORRECTION

PATENT NO. : 10,089,361 B2
APPLICATION NO. : 11/932423
DATED : October 2, 2018
INVENTOR(S) : Murthy et al.

It is certified that error appears in the above-identified patent and that said Letters Patent is hereby corrected as shown below:

In the Specification

In Column 7, Line 22, delete ""1.1.5."" and insert -- "1.1.5" --, therefor.

Signed and Sealed this
Thirty-first Day of December, 2019

Andrei Iancu
*Director of the United States Patent and Trademark Office*